W. Howe.
Truss Bridge.

No. 175

Reissued Sept. 3, 1850.

N. PETERS, PHOTO-LITHOGRAPHER, WASHINGTON, D. C.

UNITED STATES PATENT OFFICE.

WILLIAM HOWE, OF WARREN, MASSACHUSETTS.

IMPROVEMENT IN TRUSS-FRAMES FOR BRIDGES, &c.

Specification forming part of Letters Patent No. 1,711, dated August 3, 1840; Reissue No. 175, dated September 3, 1850.

*To all whom it may concern:*

Be it known that I, WILLIAM HOWE, of Warren, in the county of Worcester, in the State of Massachusetts, have invented a new and useful Improvement in the Manner of Constructing the Truss-Frames of Bridges and other Structures; and I do hereby declare that the following is a full, clear, and exact description of the principle or character which distinguishes it from all other things before known, and of the manner of making, constructing, and using the same, reference being had to the accompanying drawings, making part of this specification, in which—

Figure 1:
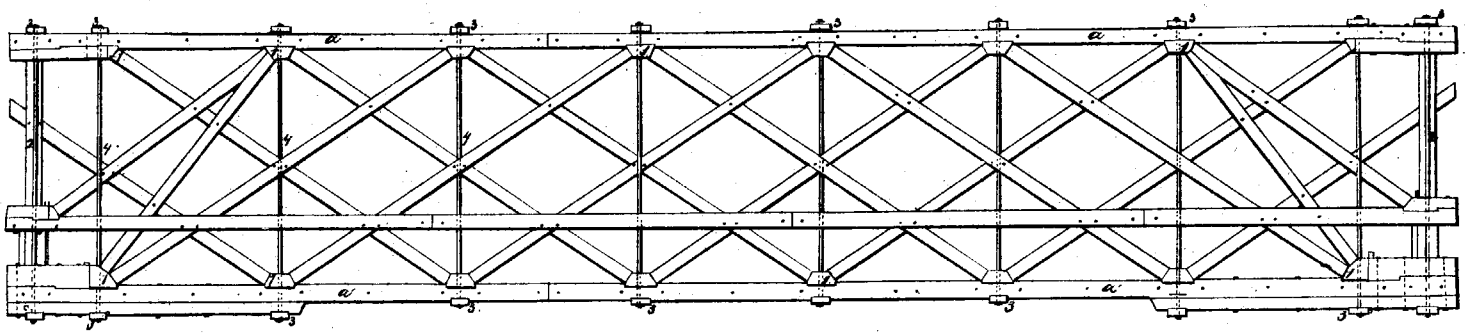
Figure 2:
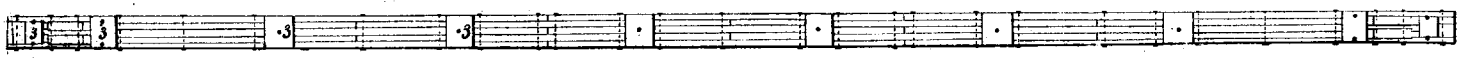

Figure 1 is a side elevation of a truss-frame, and Fig. 2 a plan thereof.

The same letters indicate like parts in all the figures.

Prior to the date of my invention the truss-frames of bridges were constructed with two sets of timbers—viz., posts and diagonal braces, the posts being seamed at top and bottom to the string-pieces by notching the one into the other, or by bolts passing through them horizontally, and with the braces either secured to the string-pieces bearing against bearing-pieces or shoes lying in the angles formed by the junction of the posts and string-pieces or chords. From this mode of construction it will be seen that the employment of tension-rods could not be very effectual in cambering the frame, as the posts would of necessity prevent the two string-pieces from being drawn nearer to one another, and in such a mode of construction the weight of the posts renders them of necessity less than useless, for they merely act as abutments to resist the thrust of the braces and to connect the upper and lower stringers, the braces having the effect to keep the stringers apart and to transfer, by the thrust, the weight applied at any one point along the length of the frame. I have by my improvement avoided these inconveniences and produced a plan by which a truss-frame can be cambered with facility along any portion of its length and without weakening the stringers, and these ends I have attained with a less weight of material than by any other mode of construction with which I am acquainted; and this consists in the employment of straining-blocks—that is, blocks that rest on or are slightly let into the upper surface of the bottom and under surface of the upper string-pieces—against which abut the ends of the timbers that are interposed between the two stringers to keep them apart, when this is combined with straining-rods that draw them together, thus employing the interposed timbers to keep the stringers apart and the tension-rods to keep or draw them together, by which arrangement I am enabled to dispense with one set of timbers. The interposed timbers and the tension-rods may be placed at any desired angle with one another.

In the accompanying drawings, *a* represents the upper, and *a'* the lower, string-pieces, the parts of which each is composed being put together in any desired manner. These two stringers are connected together at the ends by vertical posts 2 2, and along the under surface of the top and the upper surface of the bottom stringer is arranged a series of straining-blocks, 1, which are slightly let into these surfaces or otherwise retained in their appropriate places, one at top and one at bottom, for each division of the truss. The ends of the braces that are interposed between the two stringers to keep them apart abut against these straining-blocks, and the straining-rods 4, of iron, pass through them from top to bottom of the frame, with a head on one end and a screw-nut on the other, blocks 3 being interposed between the heads and the under surface of the bottom stringer.

From the foregoing it will be obvious that by turning the screw-nuts on the tension-rods the two stringers will be drawn toward each other and against the ends of the braces or timbers interposed between the straining-blocks, so that any part or the whole of the frame may be cambered at any time.

What I claim, therefore, as my invention, and desire to secure by Letters Patent in the construction of truss frames, is—

The method of uniting the upper and lower stringers without attaching them to the interposed timbers by the combination of the straining-blocks with the timbers interposed for keeping the stringers apart and the tension-rods for drawing them together, substantially as described, whereby the camber can be regulated with facility along the whole or any portion of truss, as described.

WILLIAM HOWE.

Witnesses:

ALEX. PORTER BROWNE,
CHAS. BROWNE.